US012679707B2

(12) United States Patent
Danner et al.

(10) Patent No.: US 12,679,707 B2
(45) Date of Patent: Jul. 14, 2026

(54) LOW FRICTION SKID BARS FOR MATERIAL HANDLING EQUIPMENT

(71) Applicant: KION North America Corporation

(72) Inventors: David Danner, Charleston, SC (US); McReskar Lyons, Ridgeville, SC (US)

( * ) Notice: Subject to any disclaimer, the term of this patent is extended or adjusted under 35 U.S.C. 154(b) by 370 days.

(21) Appl. No.: 18/481,281

(22) Filed: Oct. 5, 2023

(65) Prior Publication Data

US 2025/0115463 A1 Apr. 10, 2025

(51) Int. Cl.
B66F 9/12 (2006.01)
B62B 3/06 (2006.01)

(52) U.S. Cl.
CPC .............. B66F 9/12 (2013.01); B62B 3/0606 (2013.01)

(58) Field of Classification Search
CPC .................................................. B62B 2203/28
See application file for complete search history.

(56) References Cited

U.S. PATENT DOCUMENTS

| | | | |
|---|---|---|---|
| 4,596,507 A * | 6/1986 | Quinn ................... | B66F 17/003 |
| | | | 414/785 |
| 4,869,336 A | 9/1989 | Nakasaki et al. | |
| 5,221,176 A | 6/1993 | Allen et al. | |
| 5,575,608 A | 11/1996 | Yau et al. | |

| | | | |
|---|---|---|---|
| 6,632,064 B1 * | 10/2003 | Walker ................... | B65F 1/122 |
| | | | 414/785 |
| 7,275,751 B2 | 10/2007 | Simmons et al. | |
| 8,632,082 B2 | 1/2014 | Lantz et al. | |
| 9,624,080 B2 * | 4/2017 | Szlezak ............. | B23K 15/0006 |
| 9,745,180 B2 * | 8/2017 | Meijer ................... | B66F 9/122 |
| 10,988,360 B2 | 4/2021 | Cherry et al. | |
| 11,305,974 B2 | 4/2022 | Cherry et al. | |
| 2005/0017465 A1 | 1/2005 | Bergstrom | |
| 2007/0116547 A1 | 5/2007 | Bulkeley | |
| 2008/0310946 A1 | 12/2008 | Allen | |

FOREIGN PATENT DOCUMENTS

| | | | | |
|---|---|---|---|---|
| GB | 2436554 | * | 3/2007 | ............... B66F 9/12 |

OTHER PUBLICATIONS

Poly Cutting Edge & Snow Pusher Skid Shoes, https://www.maywes.com/products.

* cited by examiner

*Primary Examiner* — Mark C Hageman
(74) *Attorney, Agent, or Firm* — Bill Killough

(57) ABSTRACT

A low friction construct attached to a top plate of forks of a material handling device. The low friction construct is positioned under the forks and inboard of downwardly extending sides of the forks. The low friction construct has an elongated low friction material that extends below the downwardly extending and spaced apart sides of the forks. The low friction material contacts a pallet as the pallet is engaged. The low friction material tends to slide over the lower frame of the pallet, reducing the likelihood of pushing the pallet away.

16 Claims, 6 Drawing Sheets

LOW FRICTION SKID BARS FOR MATERIAL HANDLING EQUIPMENT

BACKGROUND OF THE INVENTION

Material handling devices, such as pallet jacks and forklifts, are used to move palletized goods and materials. A pallet jack or pallet truck is a basic form of a forklift. These devices typically move pallets within a warehouse.

Pallet jacks are steered by a tow bar. Pallet jacks typically have two forks, and a hydraulic cylinder for raising the forks. The forks are lowered to engage a pallet and then raised to elevate the pallet for movement by forcing the wheels down which raises the forks on which the pallet rests. The pallet is only lifted enough to clear a floor for movement.

A difficulty may arise when trying to load empty or nearly empty pallets on the pallet jack, or withdraw empty or nearly empty pallets from the pallet jack. Empty pallets have relatively little total weight, and therefore, little resistance to being pushed by the forks of a forklift or pallet jack. The pallet jack tends to push the pallet away from the forks rather than the forks engaging the pallet, or the pallets tend to be drug along by the forks of the pallet jack when removing the pallet from the forks.

SUMMARY OF THE INVENTION

The present invention is a low friction construct that is attached to the underneath of a top plate of forks of a material handling device. The low friction construct is positioned under the forks and inboard of downwardly extending sides of the forks. The low friction construct has an elongated low friction material that extends below the downwardly extending and spaced apart sides of the forks. The low friction material contacts a pallet as the pallet is engaged. The low friction material tends to slide over the lower frame of the pallet, reducing the likelihood of pushing or pulling the pallet when trying to load or unload the pallet from the forks of the material handling device.

BRIEF DRAWING DESCRIPTION

DESCRIPTION OF PREFERRED EMBODIMENTS

Figure 1:
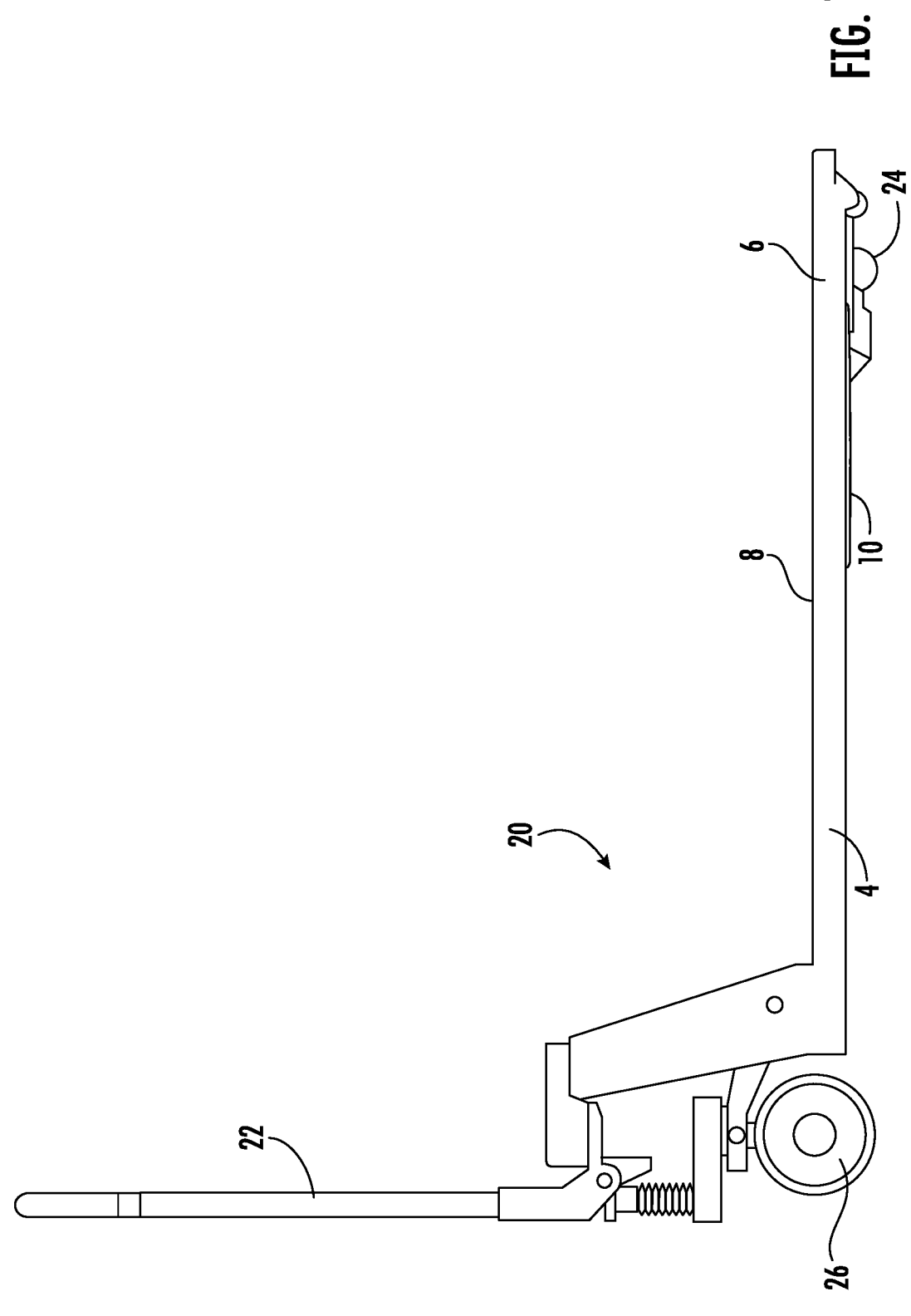
FIG. 1 is a side elevation of a pallet jack and having the elongated low friction construct attached to a fork of the pallet jack.

FIG. 1 shows a typical manual pallet jack 20 or hand truck having a tow bar 22, forks, front wheels 24 and rear wheels 26. The low friction construct 2 of the invention is shown as extending below the downwardly extending sides 4 of the forks 6. The forks as shown are in a lowered position. The manual pallet jack is shown as an example for demonstration purposes. The invention is also applicable to and useful with powered pallet jacks and other material handling devices having forks constructed to engage and transport pallets.

Figure 4:
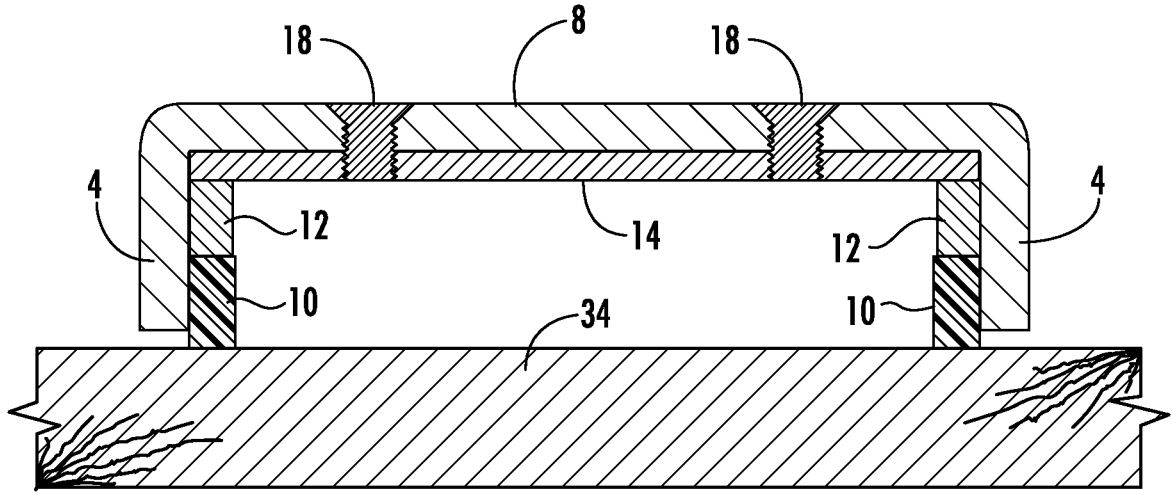
FIG. 4 is a sectioned view of the low friction construct and fork, with the low friction construct engaging a pallet.

Typical forks 6 of material handling devices comprise a top plate 8 having a general flat and planar top surface. FIG. 4. On opposing sides of the top plate 8 are downwardly extending sides 4. The downwardly extending sides are typically positioned under the top plate at, or near, opposite terminal sides of the top plate, as shown in the drawing figures. The downwardly extending sides extend downwardly from the top plate of the fork. The pair of downwardly extending sides on each fork are generally parallel to each other so as to leave an open area between them. The sides of the downwardly extending sides that face the open area are defined as the inboard sides of the downwardly depending sides.

The low friction construct 2 for a material handling device comprises a length of low friction material 10. The elongated low friction material has a coefficient of friction relative to a wood pallet or concrete floor that is substantially less than steel of which the downwardly extending sides of typical forks are formed, which is critical to the invention. The elongated low friction material is preferred to have an ASTM coefficient of friction of 0.25 or less. Ultra high molecular weight polyethylene (UHMW) is preferred to be used as the elongated low friction material for both its low friction characteristics and its wear resistance to abrasion when used with wood pallets and a concrete floor. Other materials that may be used for the low friction and abrasion resistant material are plastics, ultra-high molecular weight plastics, high-density polyethylene, or ultra high-density polyethylene. Specific materials may include including acetal, polyimide, nylon, PTFE, PEEF, and polyester resins including acetal, polyimide, nylon, PTFE, PEEF, and polyester resins. These plastics, thermoplastics and other materials have a coefficient of friction that is substantially less than steel when used in the described application.

Figure 2:
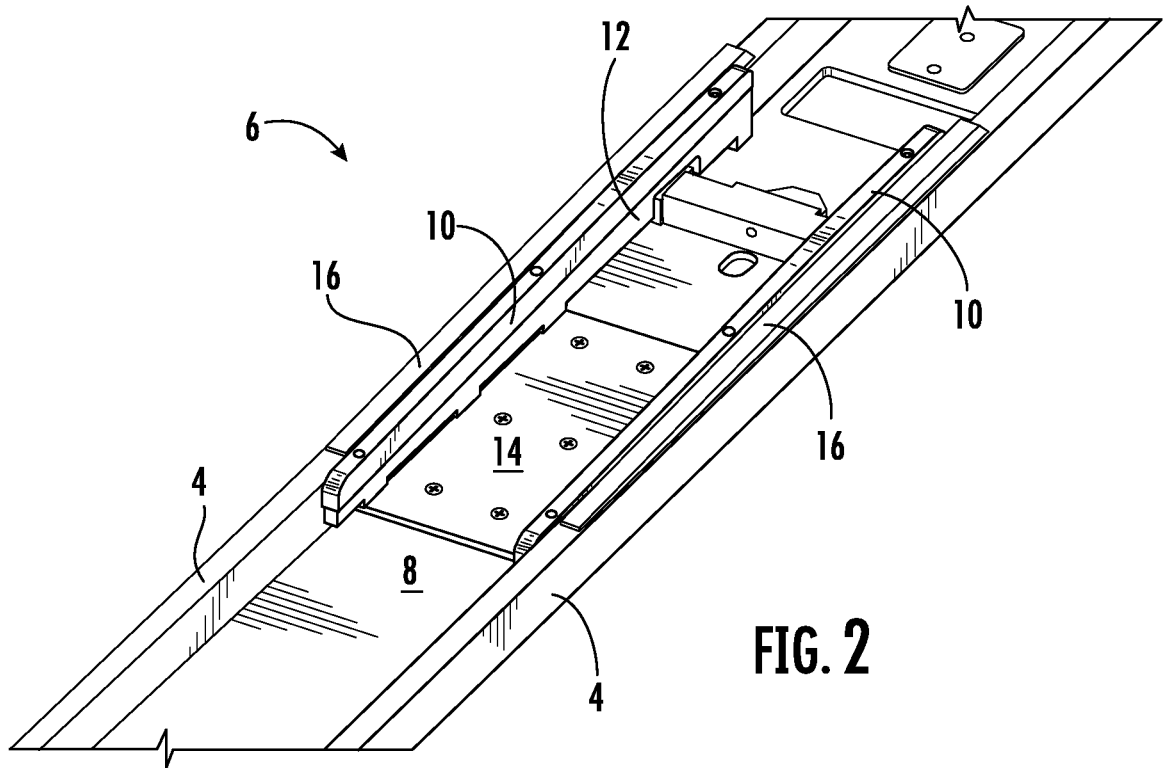
FIG. 2 is a partial perspective view of an embodiment of the low friction construct mounted to an underside of a fork of a material handling device.

As shown in FIG. 2, the low friction material 10 is mounted under the top plate 8 of the fork and to an elongated support 12. In this embodiment the elongated support 12 is substantially as long as the elongated low friction material. The elongated support 12 is attached to the top plate of the fork. The low friction material and elongated support are mounted adjacent to, and may be in contact with the downwardly extending sides of the fork. The low friction material and elongated support are mounted to the top of the fork inside/inboard the downwardly extending sides of the fork. Two (2) of the elongated low friction material are used for each fork in a preferred embodiment, with each low friction material mounted to its corresponding support frame, with one elongated support material adjacent to one of the downwardly extending sides as shown in the drawings.

In the embodiment shown in FIG. 2, a bridge 14 is provided in the space formed between the downwardly extending sides 4 and the top of the fork 8. The bridge is mounted to the top of the fork, and may provide the mounting contact for the elongated support. Use of the bridge, and mounting the elongated low friction material and the elongated support adjacent to the inside of the downwardly extending sides provides support for the low friction material as it contacts skids, provides a unitary construct that is beneficial to assembly, and improves rigidity and durability of the construct.

The elongated low friction material extends below the downwardly extending sides. The elongated low friction material also extends below steel skid bars 16 that are attached to many forks currently in use.

Figure 3:
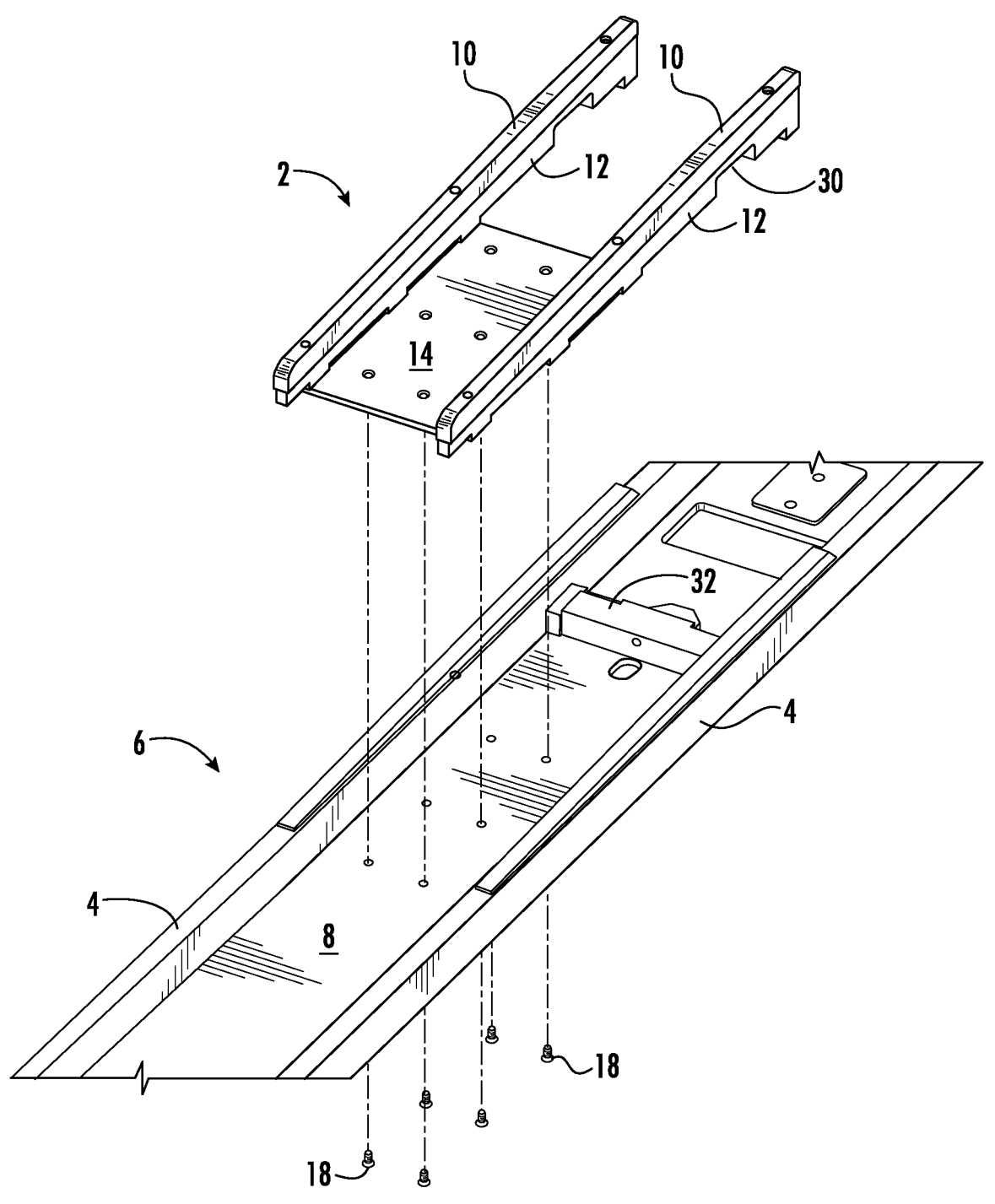
FIG. 3 is an exploded view of the embodiment of the low friction construct of FIG. 2.

FIG. 3 shows an embodiment of the low friction skid bar construct 2 having the elongated low friction material 10, the elongated skid bars 4, the elongated supports 12, and the bridge 14 formed as a unitary construct. The low friction skid bar construct is shown as exploded away from the fork. The unitary construct may be assembled as a unit, and then mounted as shown to the top of the fork. Fasteners such as screws 18 may be used to attach the construct to the top of the fork 8. Fasteners are preferred to be sunk below the top surface of the fork on the upper side of the fork to not extend above the top surface of the fork and interfere with pallet loading. In another embodiment, bridge 14 and/or the support frames 12 are welded to the underside of the top plate of the fork.

The support frames are formed with recesses 30 as required to conform to any support structure 32 or other items that are present under the fork. Bridge 14 may be a generally flat plate that extends between and connects the elongated supports. The unitary low friction skid bar construct 2 is formed and arranged so that the elongated skid bars are generally parallel to and adjacent to the downwardly extending sides of the fork.

FIG. 4 shows a sectioned view of a fork for a material handling device having with elongated low friction material 10 mounted adjacent to each of the opposing downwardly extending sides 4 of the fork and inside/inboard of the downwardly extending sides of the fork. The elongated supports are mounted to the top of the fork either by direct attachment to the top plate of fork 8, or by providing a bridge 14 that connects the elongated supports 12. The elongated low friction material extends below the downwardly extending sides of the fork, so as to contact a lower surface or wooden board of a pallet 34.

Figure 5:
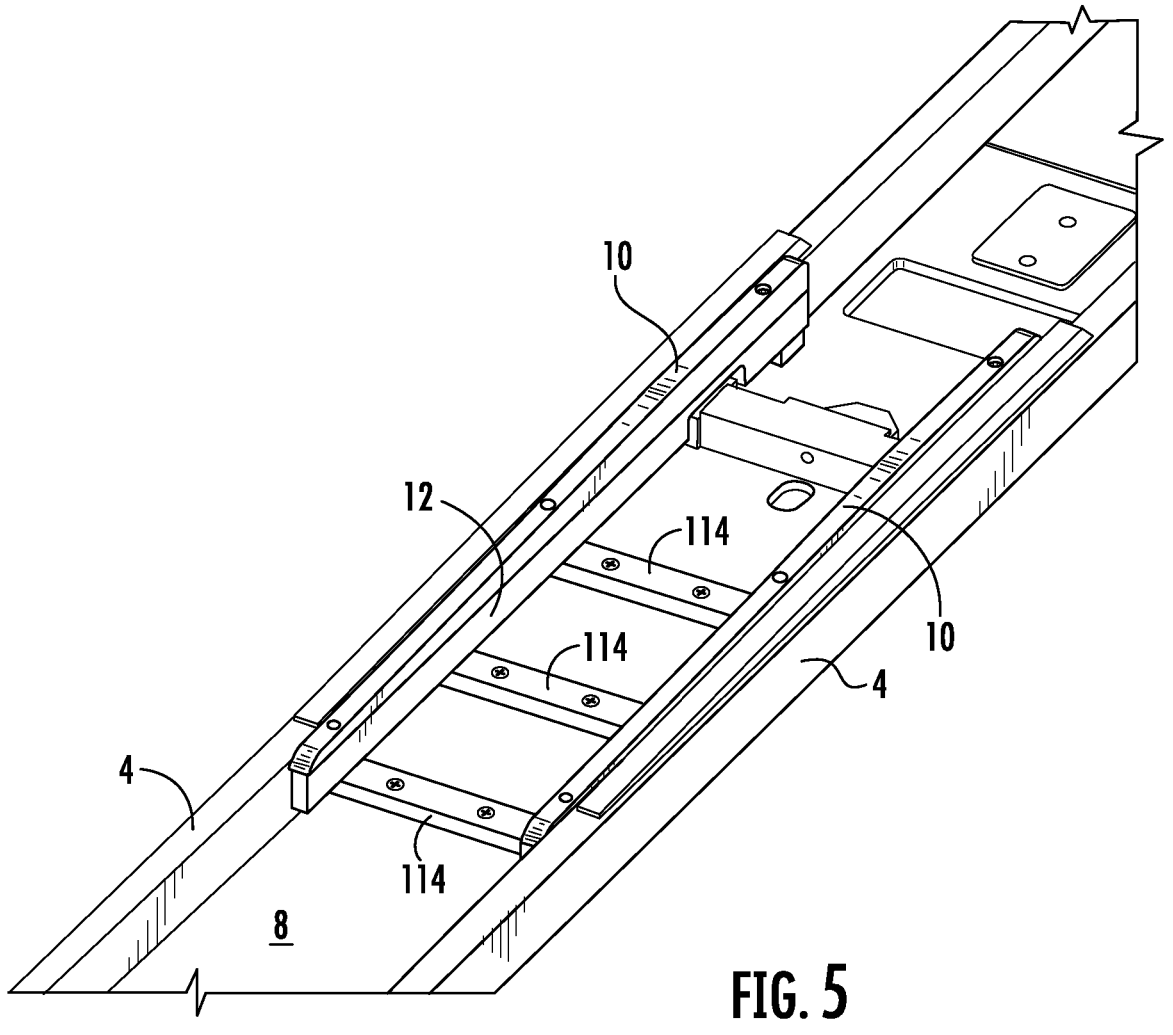
FIG. 5 is a partial perspective view of another embodiment of the low friction construct mounted to an underside of a fork of a material handling device.

FIG. 5 shows another embodiment of the low friction skid bar construct 2 according to the invention. This embodiment is substantially the same as the embodiment of FIG. 3 as described herein, but the bridge 114 is formed in a ladder type configuration, with multiple spaced apart and generally parallel ribs extending from one end of the elongated and generally parallel supports 12 toward an opposite end of the elongated and generally parallel supports.

In one embodiment, the elongated low friction material 10 and/or the elongated supports 12 are tapered along their length, with the front of the elongated low friction material having less extension below the downwardly extending sides, and increasing in the amount of extension below the downwardly extending sides toward the rear of the elongated low friction material. The low surface of the elongated low friction material forms a wedge shape for engaging the lower boards of a pallet. In another embodiment, a substantially equal dimension of the low friction material along its length extends below the downwardly extending sides.

The low friction skid bar construct may be retrofitted to forks of material handling devices currently in use. Alternatively, the low friction skid bar may be attached to the forks at the time of assembly of new material handling devices having forks.

Figure 6:
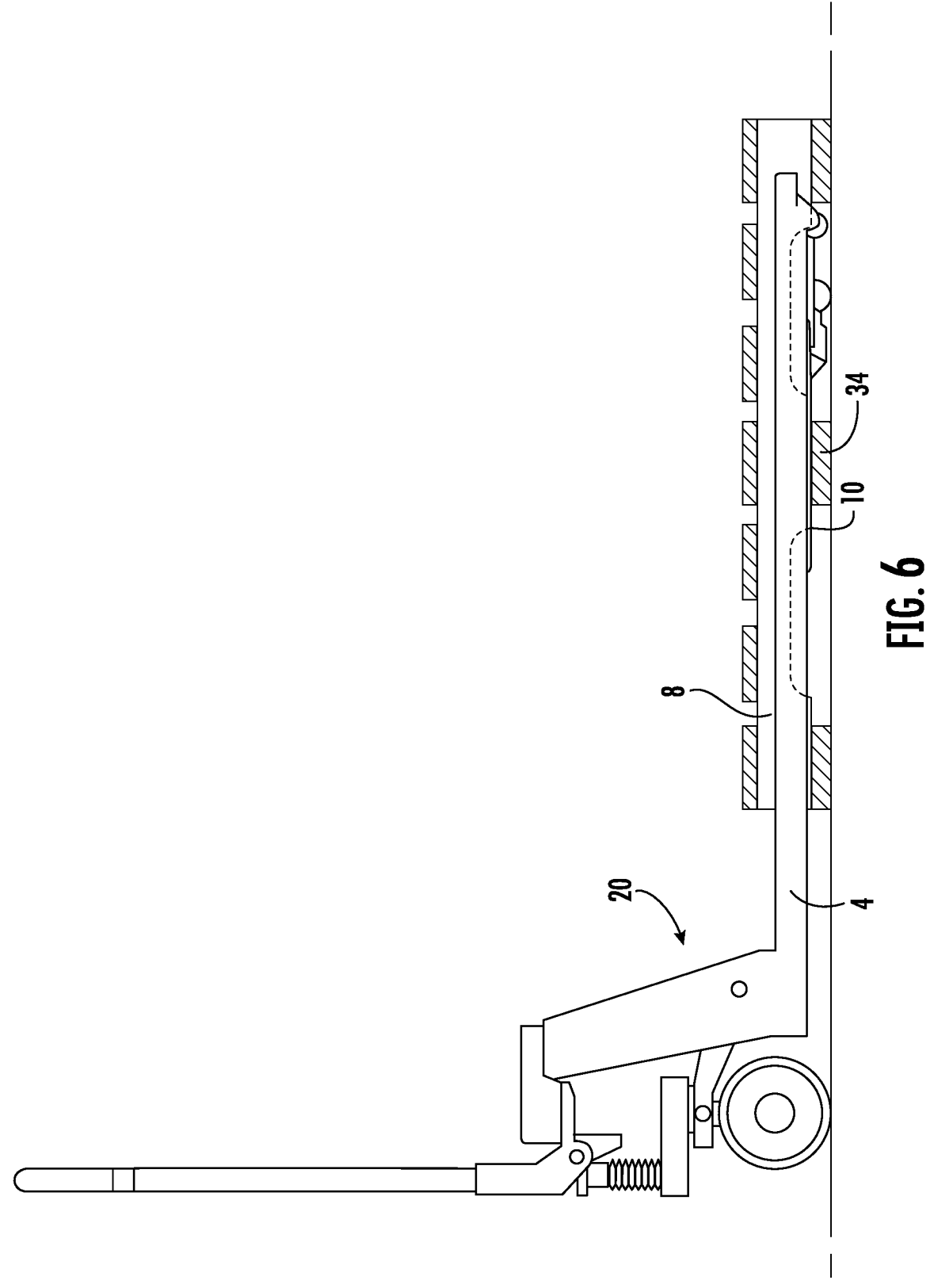
FIG. 6 shows the pallet jack of FIG. 1 engaging a pallet.

In use, the pallet jack 20 (or other material handling device having forks) engages a pallet, such as a wooden pallet in the manner for which forks of material handling devices are intended. FIG. 6. The pallet jack in this example enters the space between the upper and lower boards. The wheels then extend to raise the forks for movement of the pallet. When the elongated low friction skid bars engage the first lower board of an empty or nearly empty pallet, the elongated low friction skid bars tend to slide over the board (as well as other lower boards of the pallet) rather than pushing the pallet away from the pallet jack, as steel skid bars having higher friction tend to do. Similarly, when forks of a material handling device are withdrawn from the pallet, the forks slide over the boards of the pallet with less friction due to the low friction skid bars.

By way of example and not limitation, material handling devices and industrial trucks with which the low friction skid bars may be used are low lift pallet trucks, either powered or "walkie." The powered trucks may be electrically powered.

What is claimed:

1. A low friction construct for a material handling device, comprising:

a first elongated support frame, a fork of a material handling device having a first downwardly extending side, wherein the first downwardly extending side has an inner surface and an outer surface;

a first elongated member formed of low friction material, wherein the first elongated member formed of low friction material is attached to the first elongated support frame, and wherein the first elongated support frame and first elongated member formed of low friction material are constructed and arranged to be positioned beside and generally parallel to the inner surface of the first downwardly extending side of the fork of the material handling device, and wherein the first elongated support frame is constructed and arranged to be attached to the fork of the material handling device, and wherein the first elongated member formed of low friction material extends below a bottom surface of the first downwardly extending side of the fork of the material handling device.

2. A low friction construct for a material handling device as described in claim 1, further comprising:

a second elongated support frame, a fork of a material hand device having a second downwardly extending side, wherein a second downwardly extending side has an inner surface and an outer surface;

a second elongated member formed of low friction material, wherein the second elongated member formed of low friction material is attached to the second elongated support frame, and wherein the second elongated support frame and second elongated member formed of low friction material are constructed and arranged to be positioned beside and generally parallel to the inner surface of the second downwardly extending side of the fork of the material handling device, wherein the second elongated member formed of low friction material is spaced apart from the first elongated member formed of low friction material, and wherein the second elongated support frame is constructed and arranged to be attached to the fork of the material handling device, and wherein the second elongated member formed of low friction material extends below a bottom surface of the second downwardly extending side of the fork of the material handling device.

3. A low friction construct for a material handling device as described in claim 2, wherein the first elongated member formed of low friction material is positioned generally parallel to the second elongated member formed of low friction material.

4. A low friction construct for a material handling device as described in claim 1, wherein the first elongated support frame is constructed and arranged to contact the inner surface of the downwardly extending side of the fork of the material handling device.

5. A low friction construct for a material handling device as described in claim 1, wherein the first elongated member formed of low friction material is constructed and arranged to contact the inner surface of the downwardly extending side of the fork of the material handling device.

6. A low friction construct for a material handling device as described in claim 1, wherein the first elongated member formed of low friction material is a thermoplastic having an ASTM coefficient of friction of 0.25 or less.

7. A low friction construct for a material handling device as described in claim 1, wherein the first elongated member formed of low friction material is ultra high molecular weight polyethylene.

8. A low friction construct for a material handling device as described in claim 1, wherein the first elongated member formed of low friction material is tapered along its length to extend further beyond a bottom surface of the first downwardly extending side of the fork near a rear of the elongated member formed of low friction material than the first elongated member formed of low friction material extends below the bottom surface of the first downwardly extending side of the fork near a front of the elongated member formed of low friction material.

9. A low friction construct for a material handling device as described in claim 1, wherein the first elongated support frame is constructed and arranged to be attached under a top surface of the fork of the material handling device.

10. A low friction construct for a material handling device, comprising:

a first elongated support frame, a fork of a material handling device having a first downwardly extending side, wherein the first downwardly extending side has an inner surface and an outer surface and a second downwardly extending side, wherein the second downwardly extending side has an inner surface and an outer surface;

a first elongated member formed of low friction material constructed and arranged to be positioned beside and generally parallel to the inner surface of the first downwardly extending side of the fork of the material handling device, and wherein the first elongated member formed of low friction material extends below a bottom surface of the first downwardly extending side of the fork of the material handling device; and a second elongated member formed of low friction material, wherein the second elongated member formed of low friction material is constructed and arranged to be positioned beside and generally parallel to the inner surface of the second downwardly extending side of the fork of the material handling device, and the second elongated member formed of low friction material is spaced apart from the first elongated member formed of low friction material, and wherein the second elongated member formed of low friction material extends below a bottom surface of the second downwardly extending side of the fork of the material handling device; and a bridge constructed and arranged for positioning under a top surface of the fork of the material handling device, wherein the bridge connects the first elongated support frame to the second elongated support frame.

11. A low friction construct for a material handling device as described in claim 10, wherein a first elongated support frame for the first elongated member formed of low friction material is constructed and arranged to contact the inner surface of the downwardly extending side of the fork of the material handling device.

12. A low friction construct for a material handling device as described in claim 10, wherein the first elongated member formed of low friction material is constructed and arranged to contact the inner surface of the downwardly extending side of the fork of the material handling device.

13. A low friction construct for a material handling device as described in claim 10, wherein the first elongated member formed of low friction material is positioned generally parallel to the second elongated member formed of low friction material.

14. A low friction construct for a material handling device as described in claim 10, wherein the first elongated member formed of low friction material is a thermoplastic having an ASTM coefficient of friction of 0.25 or less.

15. A low friction construct for a material handling device as described in claim 10, wherein the first elongated member formed of low friction material is ultra high molecular weight polyethylene.

16. A low friction construct for a material handling device as described in claim 10, wherein the first elongated member formed of low friction material is tapered along its length to extend further beyond a bottom surface of the first downwardly extending side of the fork near a rear of the elongated member formed of low friction material than the first elongated member formed of low friction material extends below the bottom surface of the first downwardly extending side of the fork near a front of the elongated member formed of low friction material.

* * * * *